(12) United States Patent
Sather

(10) Patent No.: US 8,157,279 B2
(45) Date of Patent: Apr. 17, 2012

(54) TRAILING CYCLE

(75) Inventor: Charles Sather, Golden, CO (US)

(73) Assignee: IJDS, LLC, Golden, CO (US)

( * ) Notice: Subject to any disclaimer, the term of this patent is extended or adjusted under 35 U.S.C. 154(b) by 622 days.

(21) Appl. No.: 12/082,439

(22) Filed: Apr. 10, 2008

(65) Prior Publication Data
US 2009/0256329 A1  Oct. 15, 2009

(51) Int. Cl.
*B62K 27/12* (2006.01)
*B60D 1/06* (2006.01)
*F16C 11/06* (2006.01)

(52) U.S. Cl. ................ 280/204; 403/142; 280/511
(58) Field of Classification Search .......... 280/204, 280/400, 504, 511; 403/74, 76, 90, 118, 403/122, 142
See application file for complete search history.

(56) References Cited

U.S. PATENT DOCUMENTS

| | | | | |
|---|---|---|---|---|
| 3,843,145 A * | 10/1974 | Templeton | ............... | 280/7.15 |
| 4,037,853 A * | 7/1977 | Sparks | ............... | 280/204 |
| 4,077,646 A | 3/1978 | Watkins | | |
| 4,274,649 A * | 6/1981 | Vanderhorst et al. | ............... | 280/204 |
| 4,306,733 A * | 12/1981 | Cox | ............... | 280/204 |
| 4,342,467 A * | 8/1982 | Kester | ............... | 280/204 |
| 4,381,117 A * | 4/1983 | French et al. | ............... | 280/204 |
| 4,536,001 A * | 8/1985 | Wagner | ............... | 280/837 |
| 4,695,071 A | 9/1987 | Johnston | | |
| 5,067,738 A | 11/1991 | O-Connor | | |
| 5,123,668 A * | 6/1992 | Ligas | ............... | 280/204 |
| 5,240,266 A * | 8/1993 | Kelley et al. | ............... | 280/204 |
| 5,259,634 A * | 11/1993 | Berner et al. | ............... | 280/204 |
| 5,269,548 A | 12/1993 | Milligan | | |
| 5,350,184 A | 9/1994 | Hull et al. | | |
| 5,454,578 A | 10/1995 | Neack | | |
| 5,470,088 A * | 11/1995 | Adams | ............... | 280/204 |
| 5,716,065 A | 2/1998 | Liu | | |
| 5,785,335 A * | 7/1998 | George | ............... | 280/204 |
| 5,836,600 A * | 11/1998 | Chiu | ............... | 280/231 |
| 6,312,001 B1 * | 11/2001 | Boyer | ............... | 280/282 |
| 6,561,533 B2 * | 5/2003 | Snobl | ............... | 280/204 |
| 6,742,797 B2 | 6/2004 | Lopez | | |
| 6,796,575 B2 * | 9/2004 | Humes | ............... | 280/503 |
| 6,883,819 B2 | 4/2005 | Byrd | | |
| 6,893,028 B2 | 5/2005 | Smith et al. | | |
| 6,983,947 B2 | 1/2006 | Asbury et al. | | |
| 2002/0096857 A1 * | 7/2002 | Valdez et al. | ............... | 280/293 |
| 2004/0145147 A1 * | 7/2004 | Asbury et al. | ............... | 280/204 |

* cited by examiner

*Primary Examiner* — Joanne Silbermann
*Assistant Examiner* — Daniel Yeagley
(74) *Attorney, Agent, or Firm* — The Reilly Intellectual Property Law Firm, P.C.; Ellen Reilly; John E. Reilly

(57) ABSTRACT

A trailing or tow cycle having a tubular frame member, at least two wheels in parallel alignment, a seat member, an independent propulsion system and a journaled connection to a front cycle to provide a stable cycling system for individuals with special needs.

25 Claims, 14 Drawing Sheets

TRAILING CYCLE

BACKGROUND AND FIELD

The following relates to a bicycle trailing cycle and more particularly to a novel and improved trailing cycle that is designed to accommodate an individual with special needs.

Bicycling is a sport that can be accomplished individually, but also as a team. Bicycle manufacturers have designed tandem bicycles to accommodate more than one user. These types of cycles typically possess a front cycle having two wheels and a rear cycle having one to two wheels aligned in parallel, which requires balance on the part of both parties as well as stamina for pedaling. Children and individuals with special needs have a much more difficult time maintaining their balance on such cycles and therefore are often times reluctant to bicycle.

There is therefore a need for a trailing cycle that may be secured to any type of front cycle, having a stable frame that allows the rear rider to maintain their balance while also allowing the rear rider the ability to pedal at will. Furthermore, it is desirable to provide a trailing cycle that allows the rider to sit in a recumbent position and utilize a hand or foot crank to propel the cycle.

SUMMARY

The following embodiments comprise an auxiliary carrier adapted to connect to a front cycling member, a main frame assembly having a rearwardly inclining extension member, a seat member and an independent propulsion system, at least two wheels aligned in parallel with an axle therebetween, and extending from opposite sides of said main frame assembly, and a journaled connection between the front cycling member and the extension member.

In addition to the article of manufacture described above, further aspects and embodiments will become apparent by reference to the drawings and by study of the following descriptions. Exemplary embodiments are illustrated in reference to Figures of the drawings. It is intended that the embodiments and Figures disclosed herein are to be considered illustrative rather than limiting.

DETAILED DESCRIPTION

Figure 1:
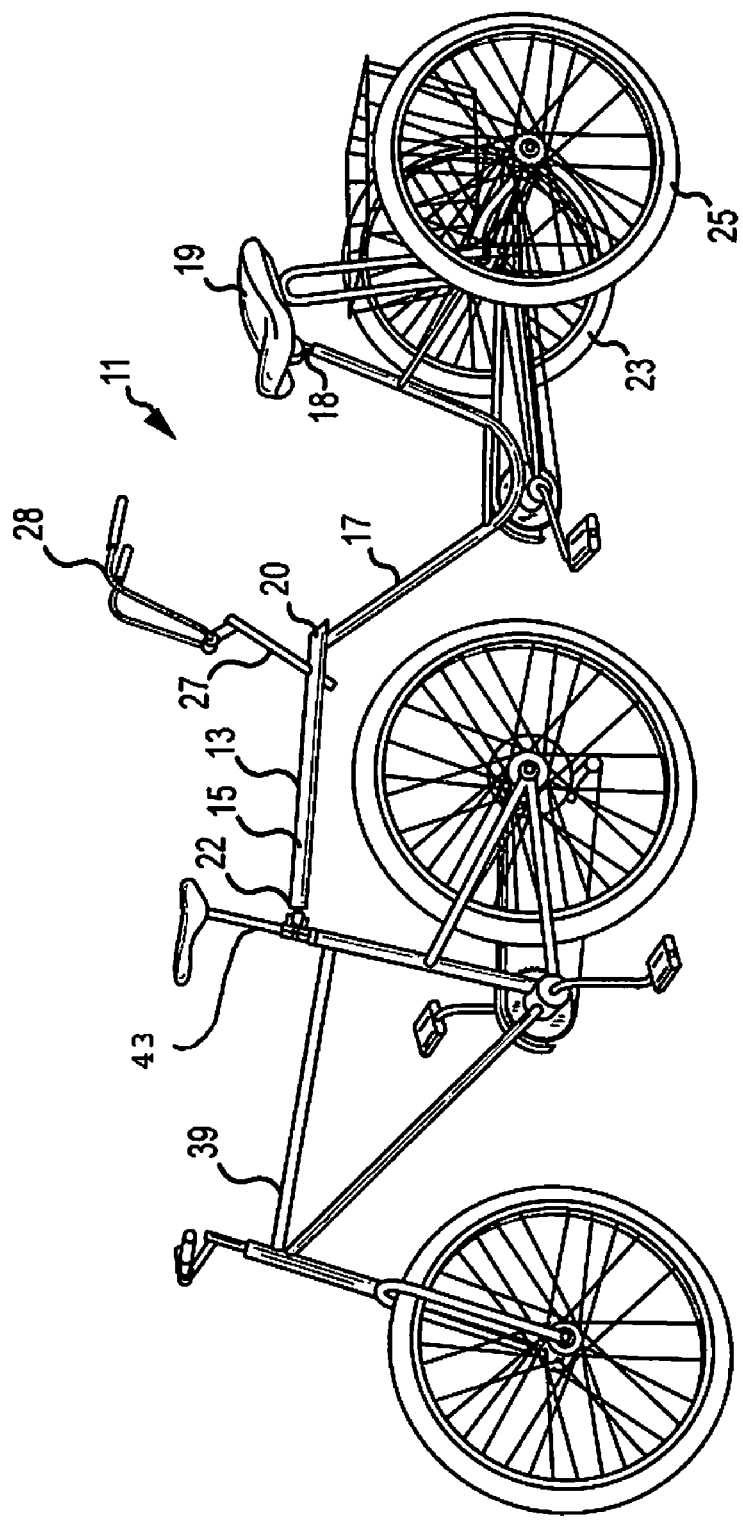
FIG. 1 is a side perspective view of trailing cycle and front cycle.
Figure 2:
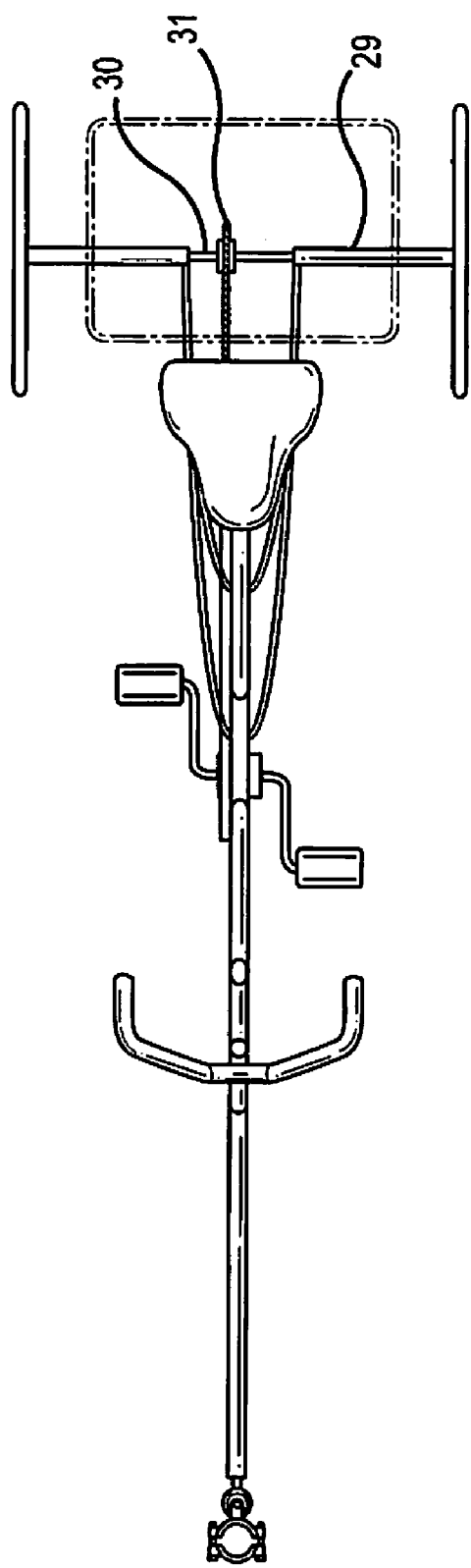
FIG. 2 is a top plan view of the trailing cycle and front cycle of FIG. 1.
Figure 3:
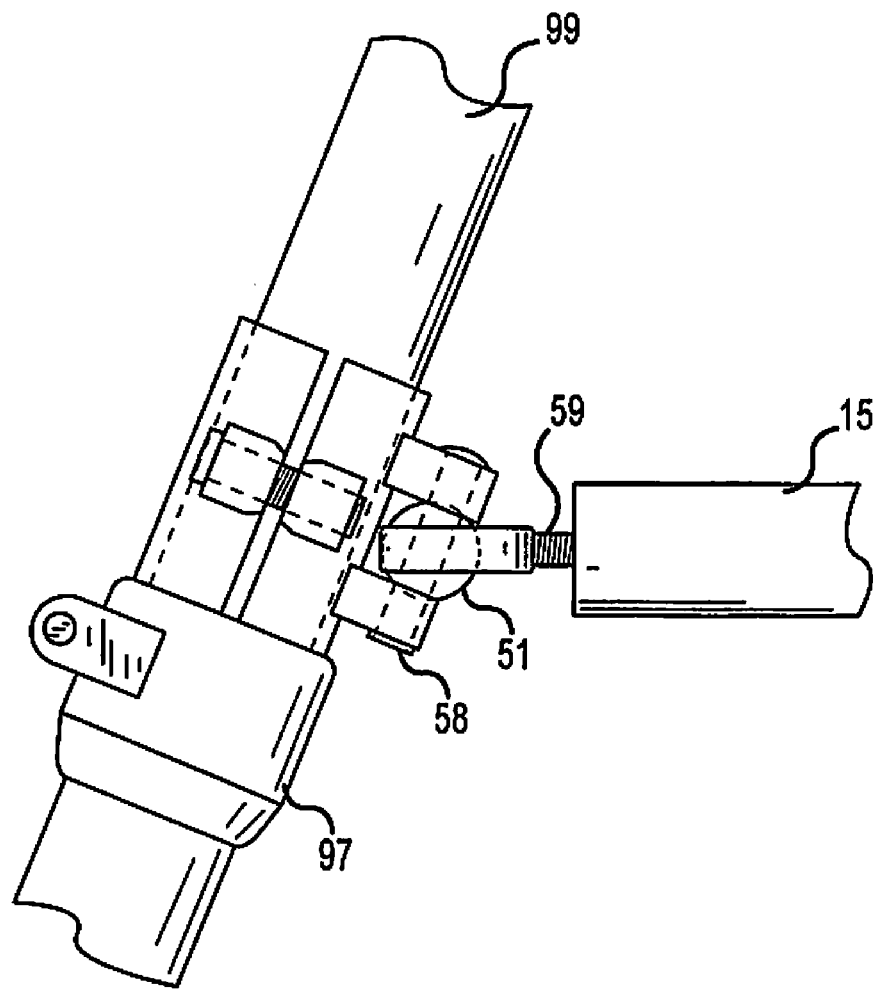
FIG. 3 is a somewhat fragmentary, enlarged side view of a securing assembly connecting a front cycle with the trailing cycle.
Figure 4:
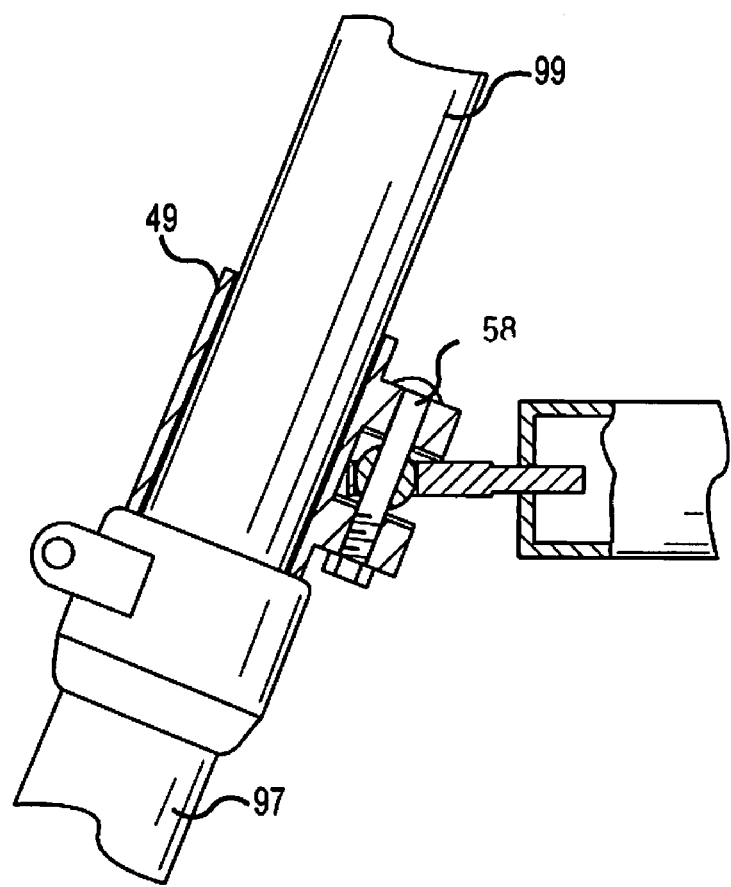
FIG. 4 is a side view partially in section of the securing assembly of FIG. 3.
Figure 5:
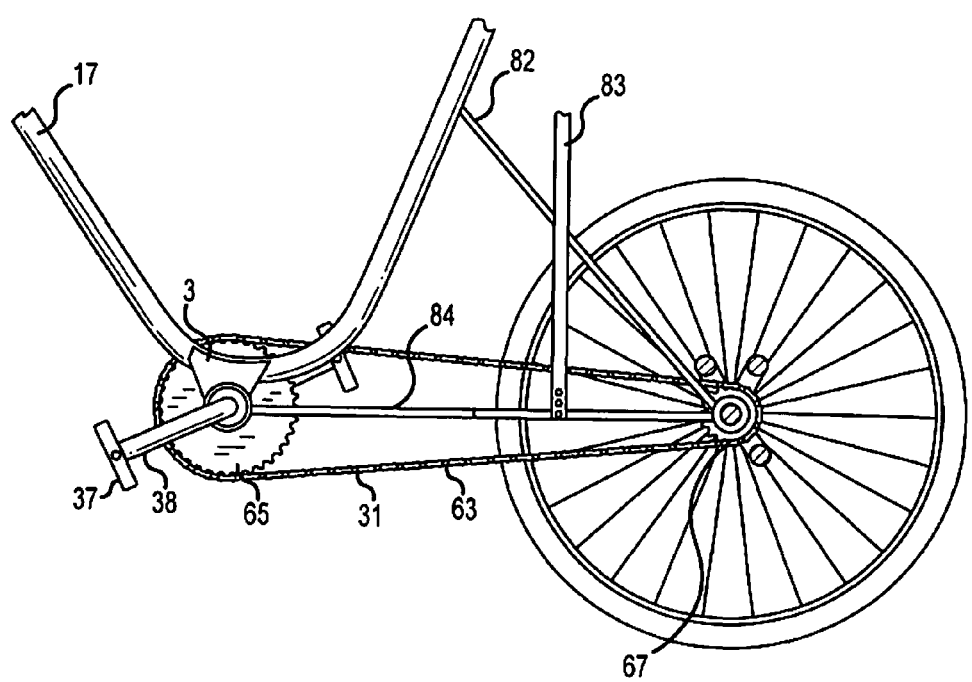
FIG. 5 is an enlarged, fragmentary side view of the trailing cycle and illustrated in more detail the chain assembly of FIG. 1.
Figure 6:
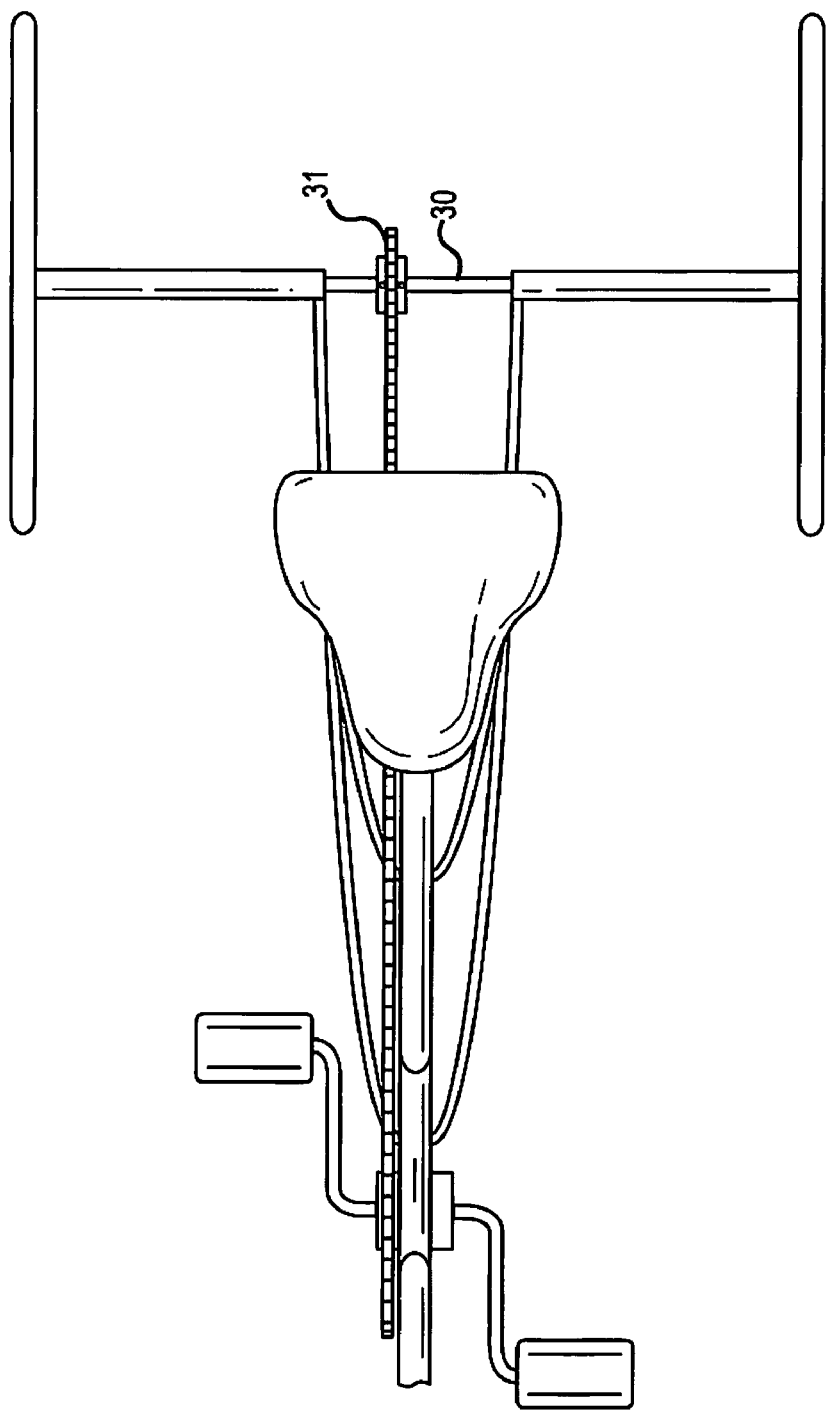
FIG. 6 is a top plan view of the chain assembly of the trailing cycle of FIG. 1.
Figure 7:
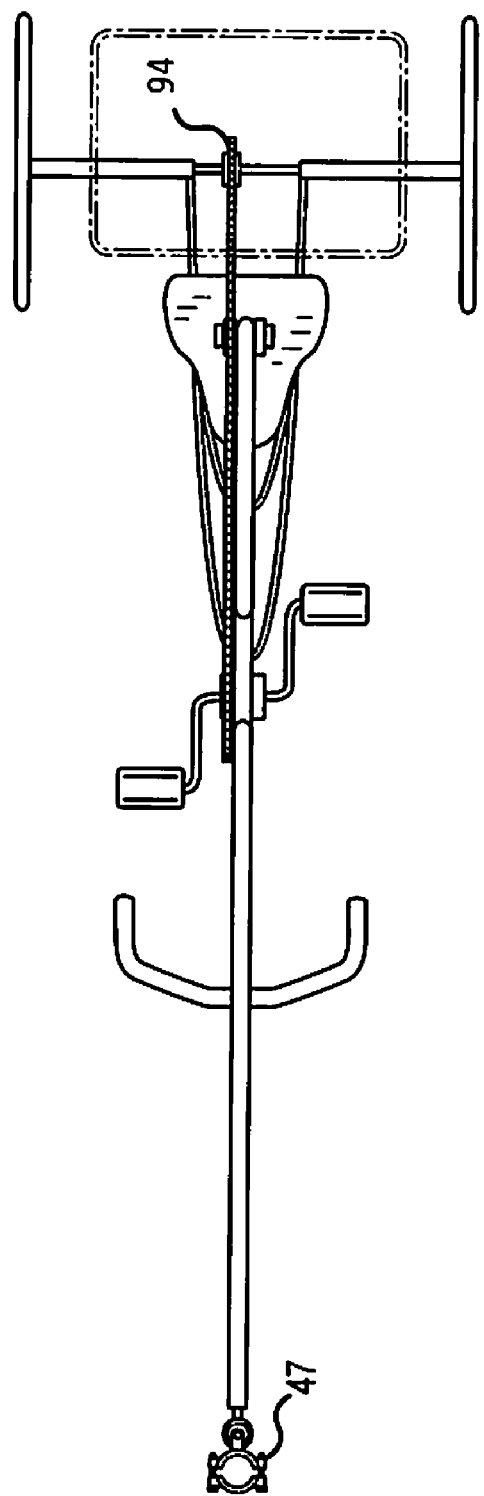
FIG. 7 is a top plan view of the trailing cycle of FIG. 1.
Figure 8:
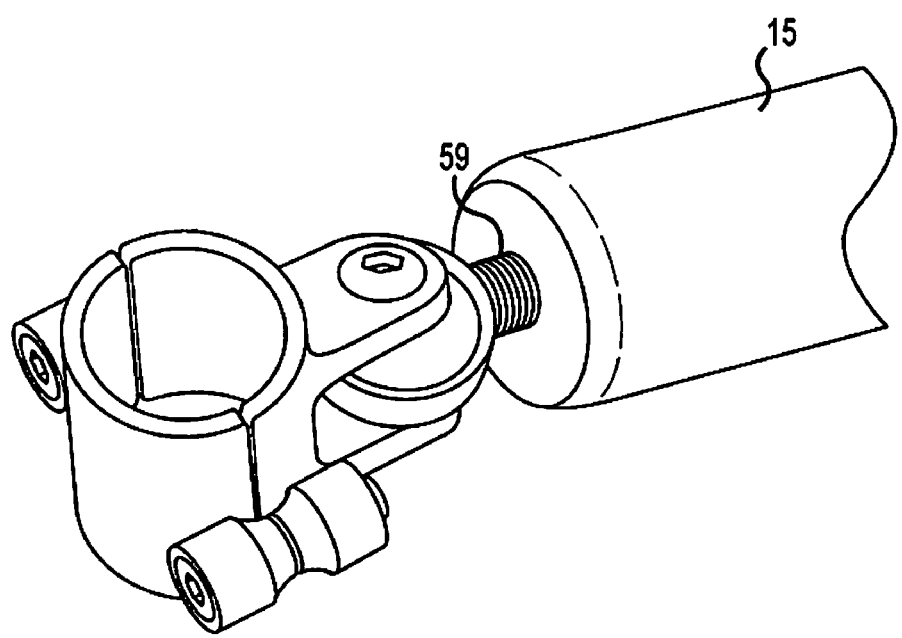
FIG. 8 is an enlarged, fragmentary perspective view of the securing assembly of FIG. 3.
Figure 9:
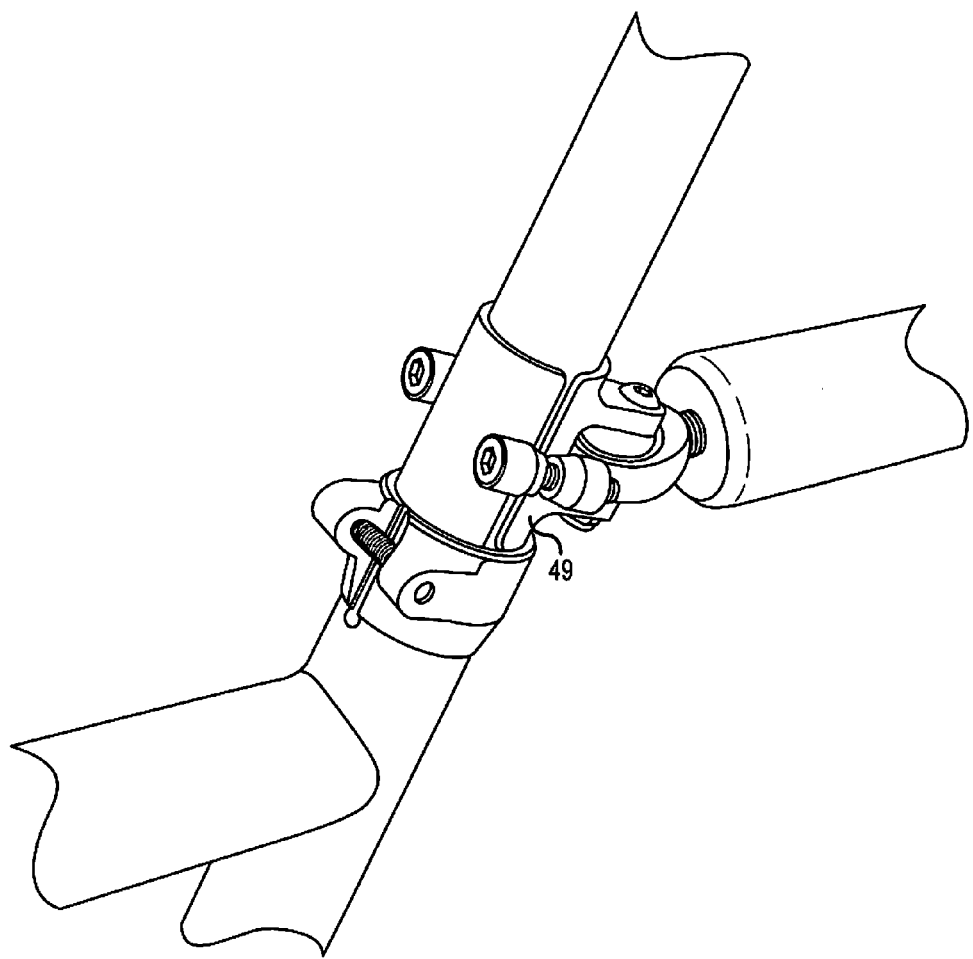
FIG. 9 is an enlarged, fragmentary side view of the securing assembly of FIG. 8.
Figure 10:
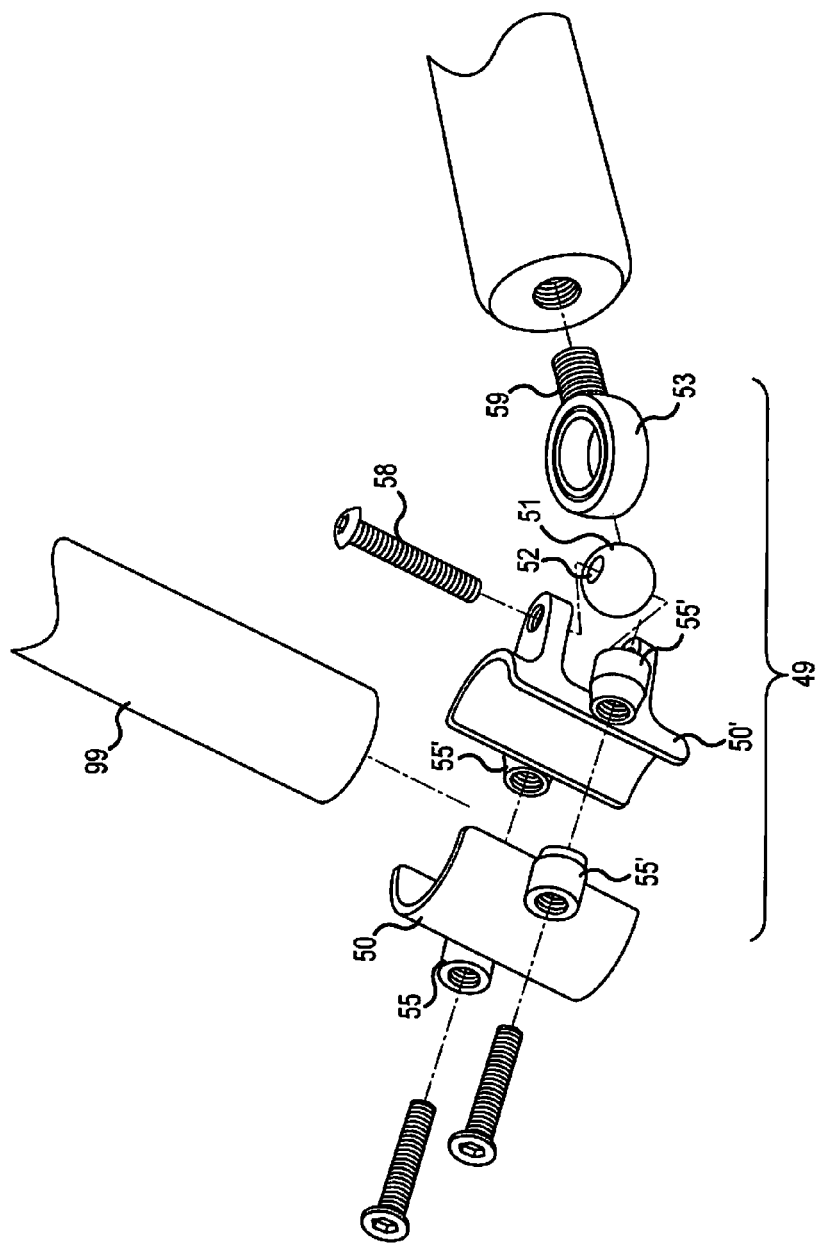
FIG. 10 is an exploded view of the securing assembly of FIG. 8.

Referring to FIGS. 1-11 there is shown a form of trailing cycle 11 having a main frame assembly 13 comprising an extruded tubular extension bar 15, a generally U-shaped tubular frame member 17 with a seat 19 attached at one end 18 and the extension bar 15 secured at an opposite end 20. Dual wheels 23 and 25 are mounted on an axle 29 and connected to a drive train assembly 31 that is connected to the frame member 17, as shown in FIGS. 2, 5 and 6. The extension bar 15 and the frame member 17 are made up of a form of metal such as aluminum, steel, carbon fibre or titanium and are hollow. The material used may also be any other metallic compositions that are lightweight yet durable and load-bearing. The extension bar 15 is connected at one end 22 with a securing or journaled assembly 47 to a lead cycle 39 and at the opposite end 20 to the frame member 17, as shown in FIGS. 1 and 2. The extension bar 15 inclines rearwardly and handlebar post 27 is connected near the end 20 and supports handlebars 28. The handlebars 28 are conventional and may have flat cruiser bars, mountain style handlebars or drop racing type bars. The handlebars may be oriented so that the rider may use them more for support and balance rather than as a steering mechanism.

In one embodiment the frame member 17, as shown in FIG. 1, is generally U-shaped but may also take many other forms depending upon the needs of the rider. The modified U-shaped frame member allows a rider to easily mount and dismount the trailing cycle without having to lift their legs over a straight frame member. The seat 19 is attached at the end 18 of the frame member 17, typically with a seat post, allowing the seat 19 to be adjustable. The seat 19 may be a standard form of bicycle seat as shown in FIG. 1 but may also have a wider saddle to provide additional support. The frame member 17 forms a chassis with the wheel members 23 and 25. There are several support bars connecting the frame member 17, the wheel members 23 and 25, as well as the drive train assembly 31. The wheel members 23 and 25 are typically conventional bicycle wheels but may also be custom made to a specific hub size. The trailing cycle is supported by these dual wheels 23 and 25 which may be rotatably mounted with forks, are aligned in parallel or tandem and are located on opposite sides of the axle 30. The wheels are mounted a specified distance apart and at a certain distance from the ground providing a low center of gravity and a wider wheel base which aids in preventing a rollover. See FIGS. 2 and 6.

The frame member 17 is connected along a lower portion with linking member 3 to the drive train assembly 31 shown in FIGS. 1, 5, 6 and 7. The drive train assembly 31 consists of a power transmission, such as, a chain or belt drive 63 trained over a large sprocket 65 and a small sprocket 67, a propulsion member such as foot pedals 37, and frame support members 82, 83 and 84. The small sprocket 67 is mounted on the axle 30. Located at each end of the axle 30 are the wheel members 23 and 25, which are typically bolted to the axle or secured with quick-release bolts. The chain 63 is trained over the large sprocket 65 and the small sprocket 67. The pedals 37 are attached to crank 38, 38' which are then attached to the large sprocket 65. Rotation of the pedals 37 causes rotation of the drive chain 63 which in turn rotates the rear sprocket 67 housing a freewheel hub 94. The freewheel hub allows the secondary rider to transmit a driving force to the rear wheels in one rotation direction. A preferred freewheel is the BMX Freewheel 16T Dicta Brand manufactured by Lida Company, Taiwan, China, but certainly other freewheels may be used as well. The freewheel allows the secondary rider the option of pedaling or coasting while riding.

The extension bar 15 is secured to a lead cycle 39 by means of a journaled connection, such as, a rotation clamp assembly 47. The clamp assembly includes but is not limited to bolt member 59 threadedly engaged with the extension bar 15. See FIGS. 3, 8, and 10. The bolt member 59 includes a rotation cup 53 having an open circular form adapted to encircle ball member 51. The ball member 51 has a circular throughbore 52 running completely through the ball member 51 that accommodates bolt member 58, such as a lag bolt. Clamp member 49 includes dual arcuate sides 50 and 50' in facing relation to one another. The clamp side 50' has spaced extension brackets with threaded openings to threadedly engage the bolt member 58, and the brackets define a notched opening therebetween to accommodate the rotation cup 53 and the ball member 51.

The rotation cup 53 is journaled on the bolt member 58 so as to be freely rotatable about the bolt member 58, and the rotation cup 53 has an inner bearing so as to be freely rotatable with the ball member 51 about the bolt member 58 as well as being able to rotate or process through a limited angle between the brackets. The rotation cup 53 is normally at an acute angle to the a longitudinal axis through the bolt member 58. The clamp side 50' also includes a pair of diametrically opposed threaded adjustment members or bosses 55' which match with diametrically opposed threaded adjustment members or bosses 55 on the second clamp side 50. Prior art typically has a single rear adjustment clamp that does not allow a clamp to be linked to the new, larger seat posts commonly used with mountain or hybrid bicycles. The dual adjustment members allow for adjustment of the clamp assembly 47 to accommodate a variety of seat posts. In the present embodiment, there is a seat post holder 97 and a seat post tube 99 having a diameter that is slightly less than the diameter of the seat post holder.

Once the trailing cycle 11 is secured to the lead cycle 39, the rotation clamp assembly 47 effectively achieves a universal connection or joint and allows a degree of rotation along a plane parallel to the ground surface, optimally to be greater than 180 degrees and up to 230 degrees. The swivel action relative to the seat post 43 connection on the lead bike 39 is around 270 degrees. The trailing cycle 11 touches the lead bike 39 only when turned beyond 90 degrees in either direction from a vertical plane to the lead bike 39. In this way, the journaled connection assembly 47 enables the trailing cycle to rotate via rotation cup 53 about the ball 51.

Alternate Embodiments

Figure 11:
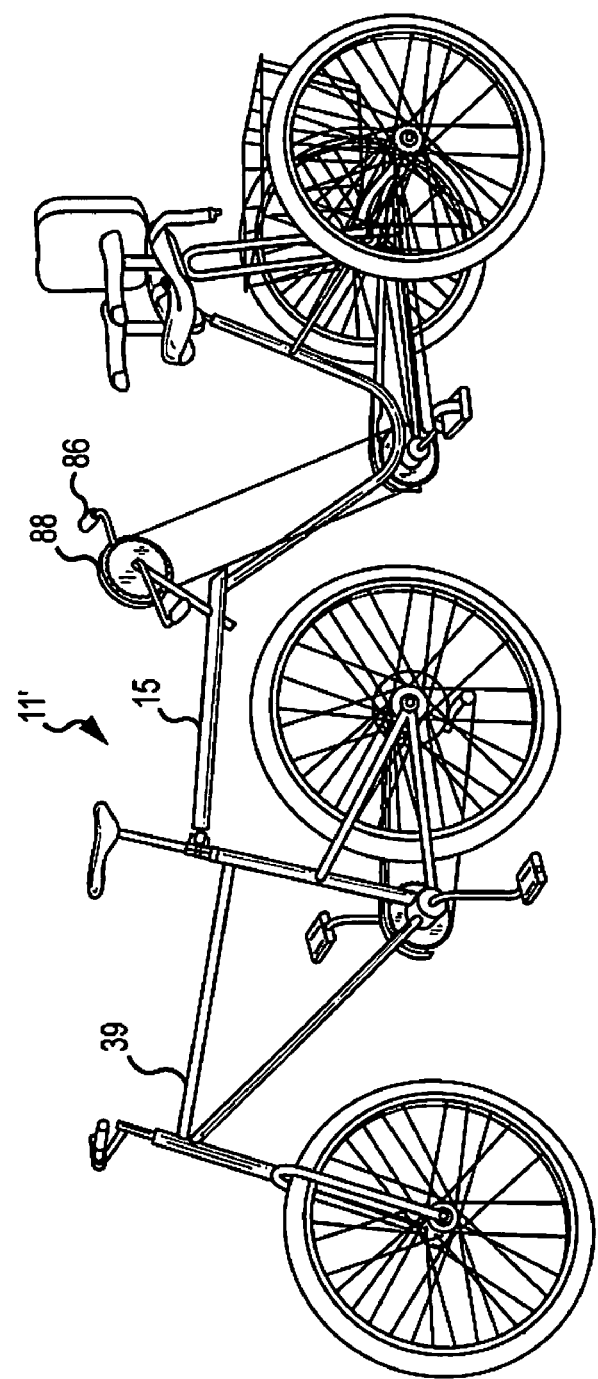
FIG. 11 is a side perspective view of one embodiment of a front cycle and trailing cycle.
Figure 12:
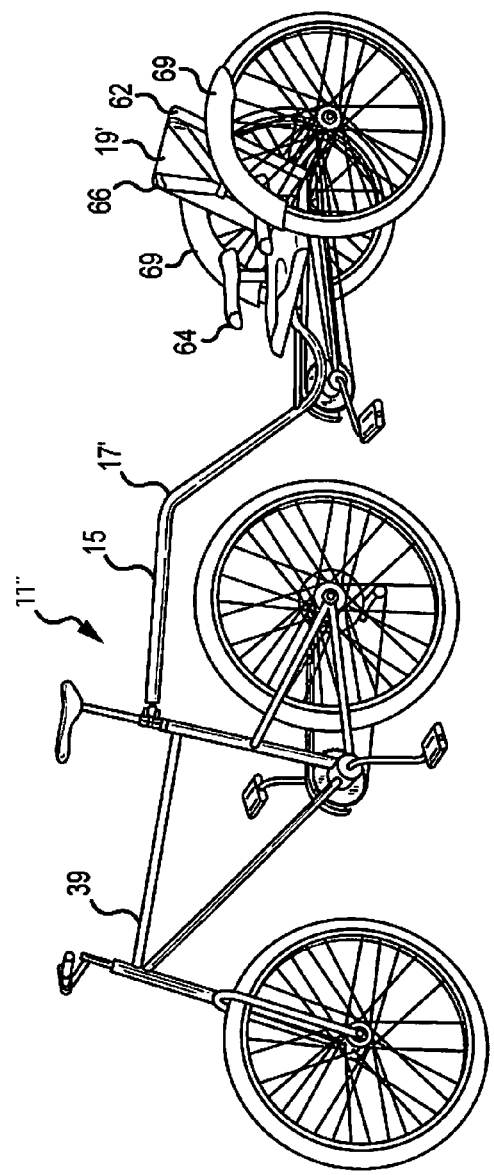
FIG. 12 is a side perspective view of an alternate embodiment of a front cycle and trailing cycle.
Figure 13:
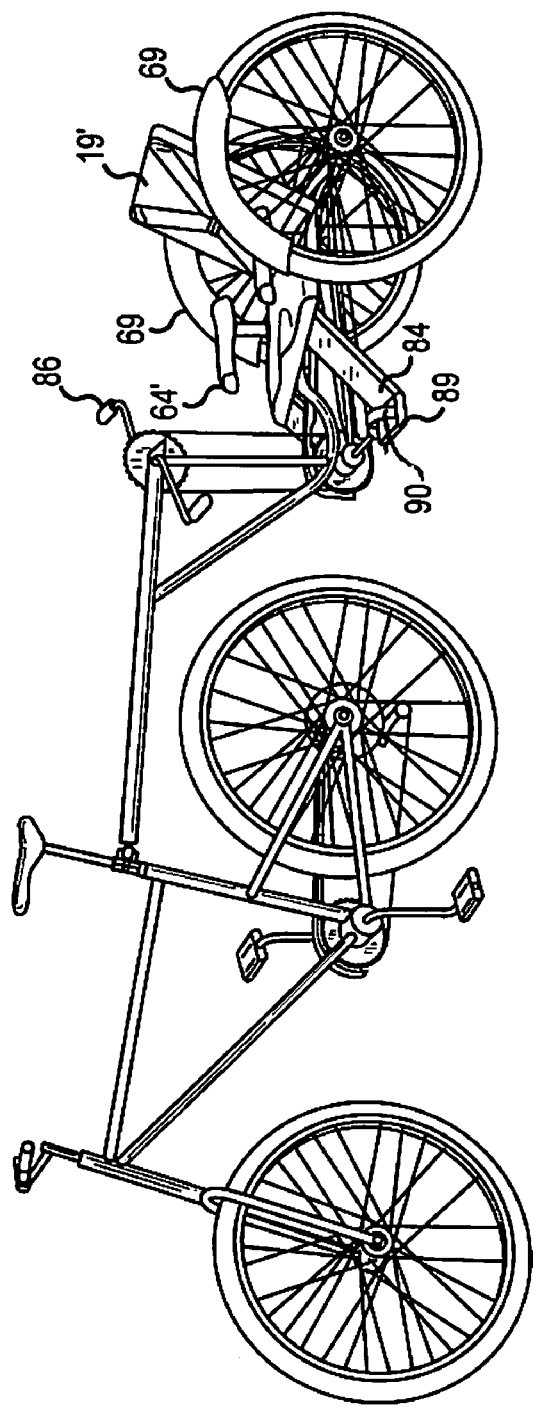
FIG. 13 is a side perspective view of an alternate embodiment of a front cycle and trailing cycle.
Figure 14:
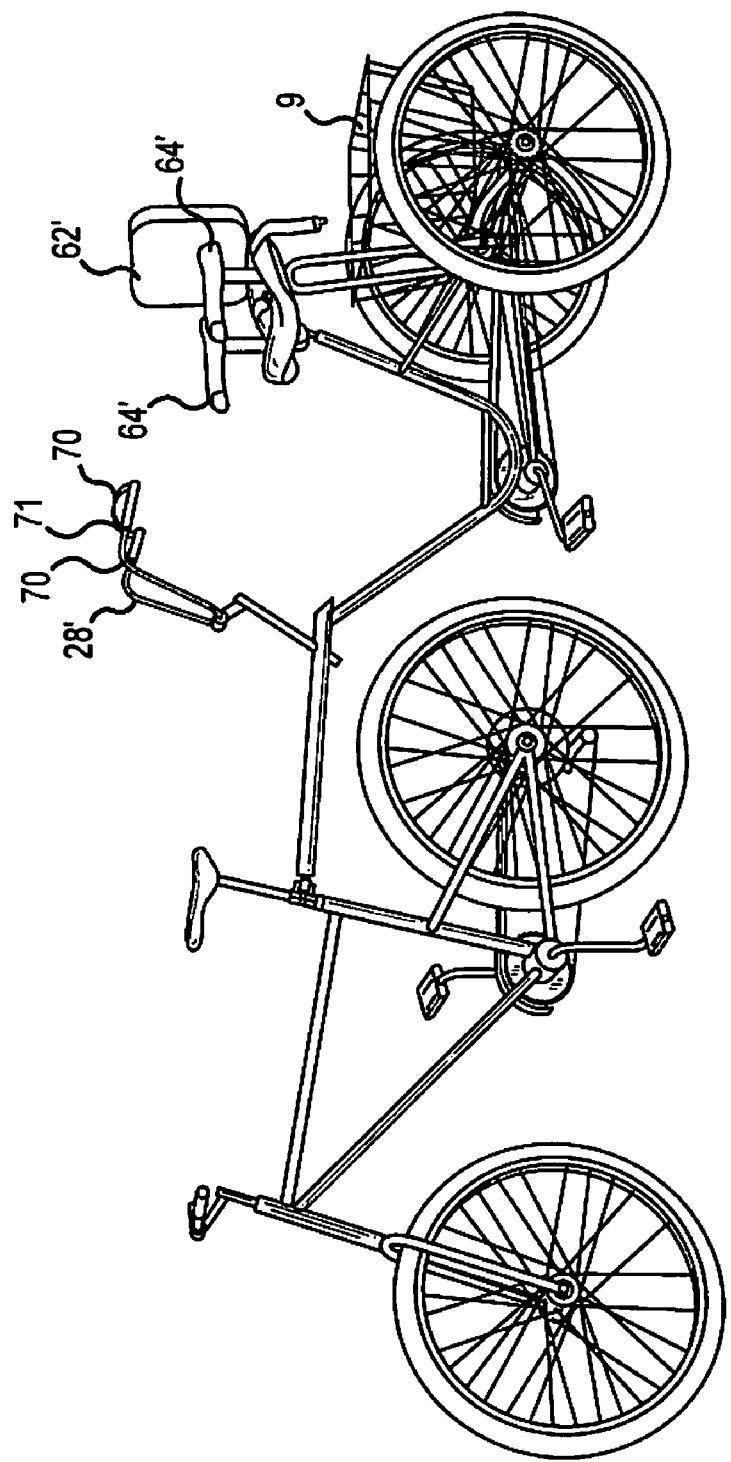
FIG. 14 is a side perspective view of a further embodiment of a front cycle and trailing cycle.

Referring to FIGS. 11 through 14 there are shown several alternate embodiments of the previously described trailing cycle. These are offered for example only and not by way of limitation. The seat member may also consist of a full support seat 19' having a back support 62 such as in a recumbent bicycle, including arm rests 64 and a shoulder/seat harness 66 or simply have a back support 62' and arm rests 64', as shown in FIG. 14. The seat may also be convertible to a wheel chair, as shown in FIGS. 12 and 13, whereby the trailing cycle 11' may be disconnected from the front cycle and adapted for use as a wheelchair. The extension bar 15' could be telescoping so disengagement from the lead cycle 39 allows the extension bar 15' to be reduced in size. Wheel covers or rims 69 as shown in FIGS. 12 and 13 may be used for the protection of the rear rider.

If a recumbent seat is used, the frame member 17' may have a different form, such as a modified L-shape as shown in FIGS. 12 and 13 to accommodate the lowered seat member. The handlebars 28' may include handhold features 70 with a strap 71 to secure the riders hands to a handgrip as shown in FIG. 14. Further, if a recumbent seat is used, the handlebars may be replaced with the arm rests 64', as previously discussed, to provide more of a resting place as shown in FIGS. 11-14.

Another embodiment includes a hand crank assembly 86, as shown in FIG. 11, that includes a fully encased chain guard 88, preventing possible injuries from the chain assembly. The stationary foot rests 89 are to include straps 90 to secure the feet of the rear rider. This design allows the rider to participate in propulsion of the cycle through upper body or lower body pedaling. A further embodiment includes collapsible rear wheels that enable the device to be easily transported as well as a convertible trailing cycle that may be used as separate transport when disengaged from a lead cycle.

A number of other modifications may be included without departing from the scope of the trailing cycle. For example, rear basket 9 may be included for storage of items, foot rests and hand rests may be added when required to aid in balance. A remote control device, similar to walkie-talkies or a headset may be used to facilitate conversation between the lead and rear riders. Rear view mirrors may also be added as an additional safety device.

It is therefore to be understood that while different embodiments or aspects are herein set forth and described, the above and other modifications may be made therein without departing from the spirit and scope of the invention as defined by the appended claims and reasonable equivalents thereof.

I claim:

1. An auxiliary carrier adapted to connect to a front cycling member, comprising:
   a main frame assembly having a rearwardly inclining extension member, a seat member and an independent propulsion system;
   at least two wheels aligned in parallel with an axle therebetween, and extending from opposite sides of said main frame assembly; and
   a journaled connection between said front cycling member and said extension member, said journaled connection including a seat post clamp member having spaced extension brackets with threaded openings for engagement of a vertical bolt member.

2. The auxiliary carrier according to claim 1 wherein said main frame assembly includes a generally U-shaped tubular member attached to said seat member and said extension member.

3. The auxiliary carrier according to claim 1 wherein said main frame assembly includes a generally L-shaped tubular member attached to said seat member and said extension member.

4. The auxiliary carrier according to claim 1 wherein said seat member includes arm rests with hand securing straps.

5. The auxiliary carrier according to claim 1 wherein said independent propulsion system includes a foot crank and a power transmission belt.

6. The auxiliary carrier according to claim 1 wherein said independent propulsion system includes a hand crank and a power transmission belt.

7. The auxiliary carrier according to claim 1 wherein said seat member is a recumbent seat.

8. The auxiliary carrier according to claim 1 wherein said journaled connection includes means for universal rotation about a ball member.

9. The auxiliary carrier according to claim 1 wherein said journaled connection includes diametrically opposed threaded adjustment members.

10. A trailing member attached to a front cycle, comprising:
    a frame assembly including a downwardly extending extension bar, a tubular main frame member, a seat member and at least two wheels;
    a journaled connection between said frame assembly and said front cycle having spaced extension brackets with threaded openings, a ball member with a circular throughbore and a bolt member for passage through said extension brackets and said ball member;
    said frame assembly having said at least two wheels aligned in a parallel plane and connected with an axle member, said axle member connected to said frame assembly with via a drive train; and
    said drive train including a power transmission belt.

11. The trailing member according to claim 10 wherein said journaled connection includes a rotation cup threadedly engaged with said extension bar and journaled on said bolt member.

12. The trailing member according to claim 11 wherein said rotation cup is at an acute angle to a longitudinal axis through said bolt member.

13. The trailing member according to claim 11 wherein said rotation cup has an open circular form adapted to encircle a ball member.

14. The trailing member of claim 10 wherein said journaled connection rotates along a plane parallel to a ground surface.

15. The trailing member according to claim 10 wherein said frame member is generally U-shaped.

16. The trailing member according to claim 10 wherein said frame member inclines downwardly from said extension bar and is attached to said seat member.

17. The trailing member according to claim 10 wherein said drive train includes a hand crank with hand pedals and a rear freewheel.

18. The trailing member according to claim 10 wherein said seat member is a recumbent seat.

19. A combination front cycle and a trailing cycle secured thereto, said trailing cycle comprising:
    a frame assembly having a horizontal extension bar, a generally U-shaped tubular frame member, a seat member, dual wheels aligned in parallel on opposite sides of said frame member and a power transmission system, said power transmission system including a power transmission belt and a freewheel assembly;
    said extension bar threadedly engaged with a journaled connection member;
    said journaled connection member defined by a bolt member, a ball member, a rotation cup and spaced extension brackets with threaded openings;
    said frame member attached to said extension bar; and
    said dual wheels rotatably mounted on an axle and connected to said power transmission system.

20. The trailing cycle according to claim 19 wherein said journaled connection member is secured to a seat post of said front cycle with dual adjustment members.

21. The trailing cycle according to claim 19 wherein said journaled connection member rotates along a plane parallel to a ground surface.

22. The trailing cycle according to claim 19 wherein said journaled connection member accommodates various sized seat post members of said front cycle.

23. The trailing cycle according to claim 19 wherein said journaled connection member rotates up to a 280 degree angle in a horizontal plane.

24. The trailing cycle according to claim 19 wherein said power transmission system includes hand pedals and a freewheel assembly.

25. A front cycling member having a tow cycle adapted for use by an individual with special needs, comprising:
    said front cycling member having at least two wheels in tandem and a power transmission system;
    said tow cycle having at least two wheels aligned in parallel with an axle member therebetween, secured to a frame member and a secondary power transmission system said secondary power transmission system including a power transmission belt and a freewheel assembly;
    said frame member including a seat, handle members and an extension member; and
    said extension member connected to said front cycling member with a ball joint, said ball joint defined by a rotation cup member, spaced extension brackets adapted to threadedly engage a bolt member, and a ball member with a throughbore for insertion of said bolt member therethrough.

* * * * *